(12) United States Patent
SanGiovanni

(10) Patent No.: US 7,215,321 B2
(45) Date of Patent: *May 8, 2007

(54) INPUT DEVICE WITH PATTERN AND TACTILE FEEDBACK FOR COMPUTER INPUT AND CONTROL

(75) Inventor: John SanGiovanni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

This patent is subject to a terminal disclaimer.

(21) Appl. No.: 10/845,646

(22) Filed: May 14, 2004

(65) Prior Publication Data

US 2004/0207601 A1 Oct. 21, 2004

Related U.S. Application Data

(63) Continuation of application No. 09/773,453, filed on Jan. 31, 2001, now Pat. No. 6,967,642.

(51) Int. Cl.
*G09G 5/00* (2006.01)
(52) U.S. Cl. .................. 345/156; 345/157; 345/173; 345/184; 345/902
(58) Field of Classification Search ............... 345/156, 345/157, 173, 184, 902
See application file for complete search history.

(56) References Cited

U.S. PATENT DOCUMENTS

| | | | |
|---|---|---|---|
| 5,627,567 A | 5/1997 | Davidson | .................... 345/173 |
| 5,764,794 A | 6/1998 | Perlin | |
| 5,798,760 A | 8/1998 | Vayda | |
| 5,933,141 A | 8/1999 | Smith | |
| 6,031,525 A * | 2/2000 | Perlin | ......................... 345/173 |
| 6,072,475 A | 6/2000 | van Ketwich | ............... 345/173 |
| 6,104,400 A | 8/2000 | Halachmi | |
| 6,181,344 B1 | 1/2001 | Tarpenning | |
| 6,320,496 B1 | 11/2001 | Sokoler et al. | .......... 340/407.1 |
| 6,441,753 B1 * | 8/2002 | Montgomery | ................ 341/34 |
| 6,473,069 B1 * | 10/2002 | Gerpheide | .................. 345/157 |
| 6,538,635 B1 | 3/2003 | Ringot | |
| 6,538,663 B2 | 3/2003 | Kamei | |

(Continued)

OTHER PUBLICATIONS

Fukumoto, Masaaki and Tonomura, Yoshinobu, "Wireless Fingering: A Body-Coupled Wearable Keyboard", Transactions of Information Processing Society of Japan, Tokyo, Japan, May 1998 (pp. 1423-1430).

(Continued)

*Primary Examiner*—Richard Hjerpe
*Assistant Examiner*—Leonid Shapiro
(74) *Attorney, Agent, or Firm*—Perkins Coie LLP

(57) ABSTRACT

The tactile input device is a user interface selection device used to transmit user information to a user interface interpretation module. The tactile input device allows a user to activate and operate applications installed on a computing system through a single user interface selection device. The tactile input device includes a tactile surface angularly divided into a plurality of sections, or petals. The tactile surface is further separated by a central portion and an outer circumferential portion, neither of which are angularly divided by the petals. Each petal and portion are tactilely distinguished from an adjacent petal or portion. The tactile distinction provides a user with feedback relating to orientation over the surface such that the user may request the performance of a specific task to be implemented by the computer through the user interface interpretation module.

15 Claims, 11 Drawing Sheets

U.S. PATENT DOCUMENTS

| | | | |
|---|---|---|---|
| 6,556,222 B1 | 4/2003 | Narayanaswami | |
| 2000/0003469 | 1/2002 | Gupta | 340/407.1 |
| 2002/0101458 A1 | 8/2002 | SanGiovanni | |

OTHER PUBLICATIONS

Leung, Ying K. et al., "Pointing Accuracy with Mobile Pen-Based Devices for On-the-Move Applications," The 8th International Conference on Human-Computer Interaction, Munich, Germany, Aug. 22-26, 1999 (pp. 218-222).

Thomas, Bruce et al., "Determination of Placement of a Body-Attached Mouse as a Pointing Input Device for Wearable Computers," 3d International Symposium of wearable Computers, San Francisco, California, Oct. 18-19, 1999 (pp. 193-194).

Landay, J.S.; Kaufmann, T.R., 1993, User Interface Issues in Mobile Computing; pp. 40-47; Fourth Workshop on Workstation Operating System, Oct. 14-15, 1993, Napa CA.

Rieck, Anke, 1996, Aspects of User Interfaces in Mobile Environments; pp. unknown; Workshop IMC '96: Information Visualization and Mobile Computing, 1996, Rostock, Germany.

Kawachiya, Kiyokuni; Ishikawa, Hiroshi, 1998, NaviPoint: An Input Device for Mobile Information Browsing; pp. 1-8; Conference on Human Factors in Computing Systems, Apr. 18-23, 1998; Los Angeles CA.

Mohageg, Michael, 1999, User Interface Design in the Post-PC ERA; pp. 1137-1142; The 8th International Conference on Human-Computer Interaction, Aug. 22-26, 1999; Munich, Germany.

\* cited by examiner

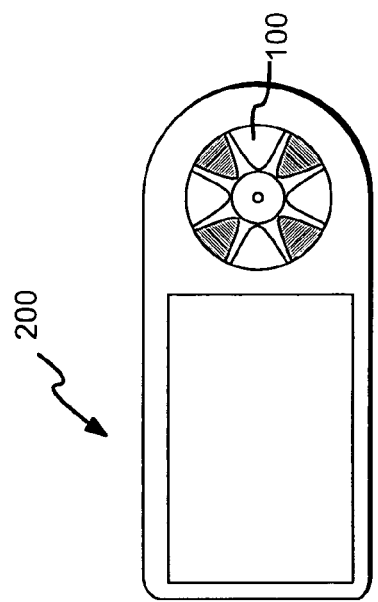
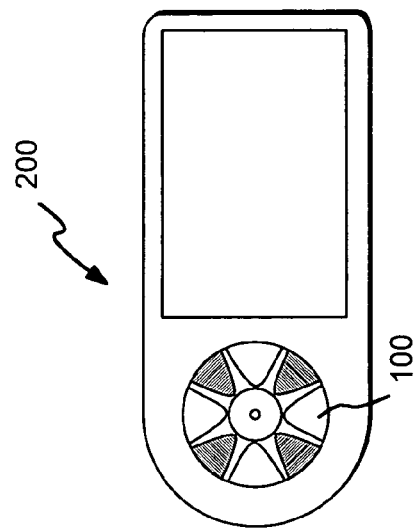
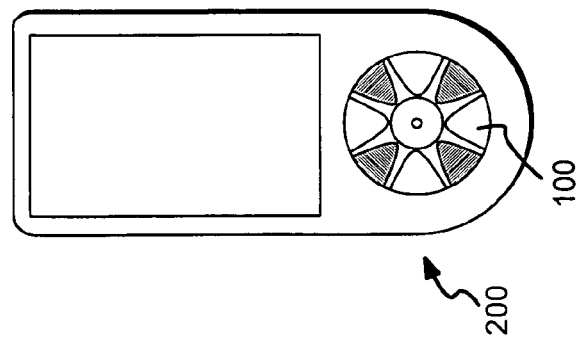

INPUT DEVICE WITH PATTERN AND TACTILE FEEDBACK FOR COMPUTER INPUT AND CONTROL

RELATED PATENT APPLICATIONS

This application is a continuation of U.S. patent application Ser. No. 09/773,453, entitled "Input Device With Pattern And Tactile Feedback For Computer Input And Control," filed Jan. 31, 2001, now U.S. Pat. No. 6,967,642 which is hereby incorporated herein by reference in its entirety.

TECHNICAL FIELD

The invention relates generally to an input device that is operably connected to a computing system to provide computer input and control. More particularly, the invention relates to a tactile-patterned input device for selecting controls and inputting information into a computing system and providing sensory feedback to the user.

BACKGROUND OF THE INVENTION

As computers have become more complex, user interfaces have had to adapt to allow the user to control the operations of the computer. Initially, the interface used was a command line interface, which utilized a series of typed commands formatted in a specific syntax familiar to the computer and eventually learned by computer users. This interface was eventually replaced by the Graphical User Interface ("GUI"), which allows users to point to objects, buttons, and windows displayed like items on a desk. Interaction between the GUI and a user is accomplished through a display and user interface selection device. Initially, the user interface selection device was a light pen, a pen-based computer control requiring the user to select and highlight objects on the screen by touching the light to the object on the screen. However, this implementation had its disadvantages because, by design, the user's hands and the light pen would obscure a portion of the screen from the user's own view. This and other disadvantages led to the development of the mouse, an interface control separate from the keyboard that controlled a pointer on the GUI for selecting and highlighting objects, buttons, and windows.

Current methods available for text input and desktop environment navigation through a user interface selection device into a computing system are associated with at least one of several disadvantages. Although keyboards allow for fast textual input, they are extremely cumbersome for navigating through a desktop environment. Similarly, although a mouse is ideal for navigating through a desktop environment, it is not a good text-input solution. Likewise, joysticks and conventional laptop touchpads allow for fast navigation, but are cumbersome textual input devices. Most conventional systems alleviate the aforementioned problems by a combination of a keyboard and a mouse, touchpad, or joystick. However, this implementation introduces another significant obstacle of requiring two-hand operation of the user interface.

The growth of the personal digital assistant ("PDA") and wearable computer markets are associated with similar problems realized in the larger-scale computing systems. As PDA technology continues to rapidly advance with respect to the size of PDA electronics and batteries, the size of the handheld and mobile devices becomes more dependent upon the input devices used.

The current most practiced method of interaction between a user and a PDA is through the use of a stylus. In stylus-based interaction, the user holds the device in one hand and the stylus in the other. While such interaction is similar to the use of a conventional pad and paper, it is not without disadvantages. First, it requires two-hand operation. Second, complex software algorithms are typically needed to recognize the user's handwriting. Third, stylus-based interaction requires the user to look at the device while using it. Other methods of interaction, such as the 9-Key method commonly used in cellular telephones and voice recognition, are characterized by any one of the above-mentioned disadvantages.

SUMMARY OF THE INVENTION

In accordance with this invention, the above and other problems are solved by the tactile input device. The tactile input device is a user interface selection device operably connected to a user interface interpretation module providing user interaction to a computing system. Computer control using the tactile input device may be performed with only one hand.

The tactile input device is designed to have three-dimensional characteristics and tactile patterns so that the user can feel the exact location of his/her finger on the pad. The tactile input device is designed to lie directly under the thumb of the user's hand that is holding the input device, thereby allowing single-hand operation of the computing system during user-system interaction. In addition to being designed for text input and editing, the tactile input device is also designed for direct selection of programs and menu items, thereby allowing operation of the computing system through only one input device.

The tactile input device includes a pattern of raised (tactile) lines arranged in a pattern of a predetermined number of petals, each petal originating around the center of the input device and extending outward, a tactile-defined central portion having a raised dot in the center, and at least one tactile-defined outer circumferential portion. Every other petal contains raised lines to distinguish tactile sensing between adjacent petals. Each petal and portion is associated with a functionality directing the performance of a task in the computing system. Text input and editing are accomplished by stroke actions beginning in the inner portion, continuing to a petal or petals (depending upon the desired character), and ending in the inner portion. Programs are selected on the tactile input device by selection of a position corresponding to the desired program referenced on an outer circumferential portion of the tactile input device. Once the desired program is selected, the functionality associated with each petal and each circumferential portion is updated to represent tasks associated with the program. The functionalities associated with the petals and circumferential portions are continually updated to represent new tasks, operations, and characters following each selection, or input stroke, on the tactile input device.

In accordance with other aspects, the present invention relates to a method of inputting control and text commands into a computing system from a tactile patterned input device. The method locates at least one input sensing device on each section of a tactile surface of the input device. Once the process has begun, the input sensing devices are initialized to represent a user request to perform a task in the computing system. The input sensing devices corresponding to the user request are selected through an input stroke identifying the task to be performed. Once the user's selection of the input sensing devices are detected by the input device, a selection signal is sent to the computing system thereby inputting the command into the computing system. The task is either the activation or operation of an application installed on the computing system.

In accordance with still other aspects, the present invention relates to a tactile-surfaced input device, or user interface selection device, for inputting information into a computing system. The tactile surface is divided by a plurality of sections, or petals, with each section being tactilely distinguished from its adjacent sections. Each section contains one or more input sensing devices detecting an input stroke. Each input stroke represents a user request. Once selected, the input sensing device transmits a selection signal indicative of the user request to the computing system.

The selection signal carries information to be generated by the computing system. The information identifies tasks, or commands, to be implemented by the computing system.

The invention may be implemented as a computer process, a computing system or as an article of manufacture such as a computer program product or computer readable media. The computer program product may be a computer storage media readable by a computing system and encoding a computer program of instructions for executing a computer process. The computer program product may also be a propagated signal on a carrier readable by a computing system and encoding a computer program of instructions for executing a computer process.

The great utility of the invention is that the tactile input device introduces a fast and convenient device for interacting with the user interface installed on a computer. The three-dimensional and tactile characteristics of the present invention provide the user with sensory feedback during the user's operation of the input device. The sensory feedback can be used without a display and only requires the use of one hand. Since desktop environment navigation and textual input are both supported by the tactile input device, users are provided a way to operate their devices through a single input device. The advantages of this utility become even more apparent as consumers demand smaller, faster, and easier to use computers. In particular, this invention will be of great importance to designers of personal digital assistants, mobile computers, and wearable computers. Not only does the present invention allow users to operate such devices using a single hand, but it also provides for high-speed interaction while on the move.

The tactile input device is tactically designed to lead to muscle memory, thereby enabling use of the input device without having to reference a display. The tactile input device gives a user complete control over the computer. In particular, a user may navigate through a desktop environment and input/edit text into applications installed on the computing system while using only the tactile input device.

These and various other features, as well as advantages, which characterize the present invention, will be apparent from a reading of the following detailed description and a review of the associated drawings.

BRIEF DESCRIPTION OF THE DRAWINGS

FIG. 2A shows the tactile touchpad of FIG. 1 connected to a personal digital assistant in accordance with an embodiment of the present invention.

FIG. 2B shows the personal digital assistant of FIG. 2 having a landscape orientation and adapted for left hand use.

FIG. 2C shows the personal digital assistant of FIG. 2B adapted for right-hand use.

FIG. 5 also illustrates an input stroke to be used for inputting text with the tactile input device in accordance with one embodiment of the present invention.

DETAILED DESCRIPTION OF THE INVENTION

Figure 1:
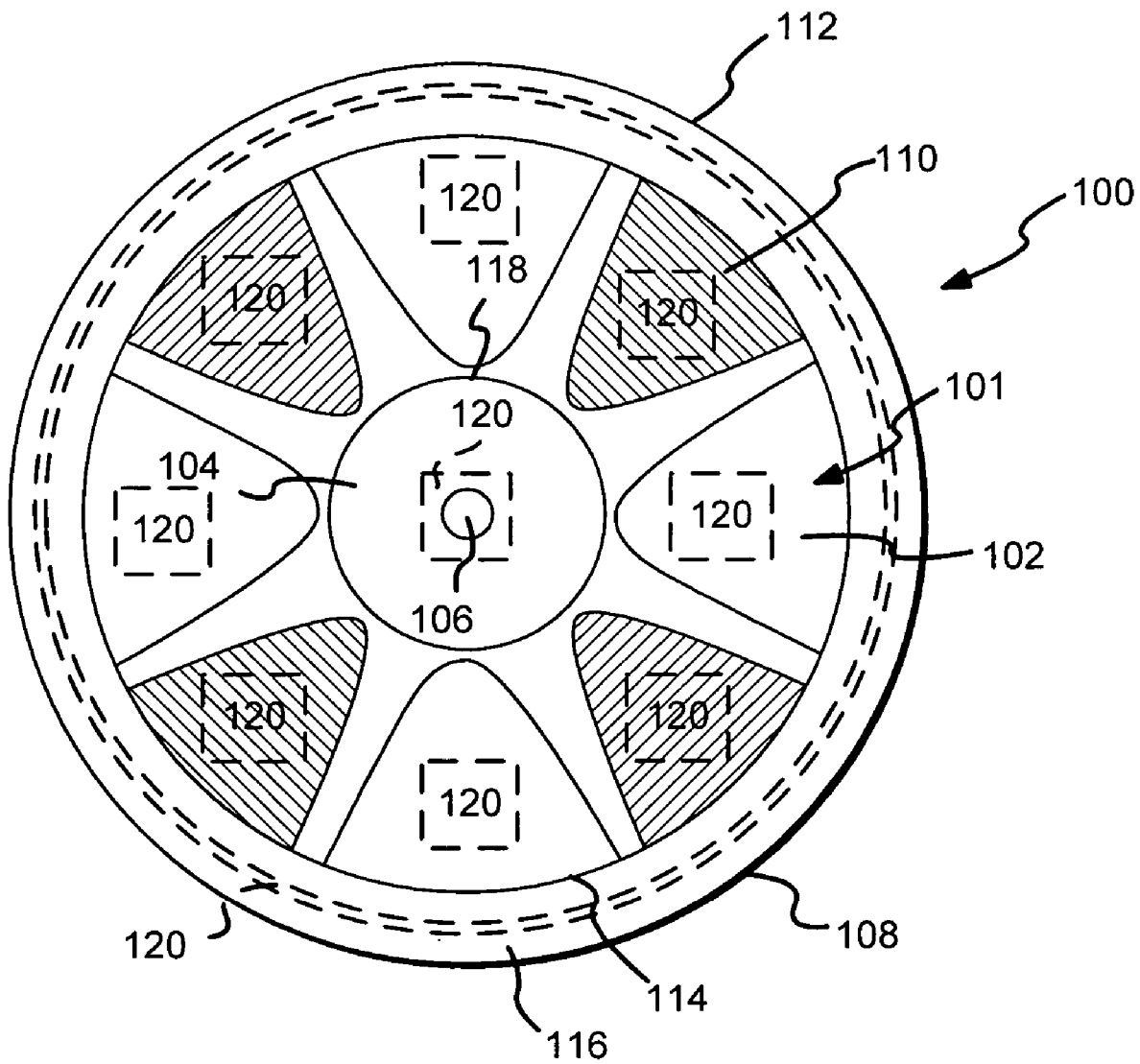
FIG. 1 shows an embodiment of the tactile touchpad.

FIG. 1 illustrates a tactile input device 100 in accordance with an embodiment of the present invention. A surface of the tactile input device 100 is divided into various sections having one or more input sensing devices 120 for detecting an input stroke. In the embodiment of FIG. 1, the sections include a petals portion 101 having eight angular petals 102, a central portion 104 having a raised dot 106, and an outer circumferential portion 108. In one embodiment (as shown in FIG. 1), the tactile input device 100, the central portion 104, and the outer circumferential portion 108 are circularly defined. In another embodiment, the tactile input device 100, the central portion 104, and the outer circumferential portion 108 are any one of a number of geometric shapes, such as, but not limited to, rectangular, triangular, oval, octagonal, or hexagonal. While a number of geometric embodiments have been described for the tactile input device 100, any number of combinations of geometric shapes might be used with the tactile input device 100.

In accordance with one embodiment, every other angular petal 102 is tactically defined with raised lines 110 in order for a user to physically distinguish between adjacent petals 102. Each angular petal 102 is outlined with a raised border 112 in order to further tactically distinguish the boundaries of each angular petal 102. The outer circumferential portion 108 is outlined with raised borders 114 and 116. Alternatively, the outer circumferential portion 108 could be tactically defined by being raised, by being filled with raised lines, or by being manufactured with a material having a different feel than the rest of the tactile input device 100. In accordance with an embodiment, the central portion 104 is outlined by a raised border 118. Alternatively, the central portion 104 could be tactically defined by being raised, by being filled with raised lines, or by being manufactured with a material having a different feel than the rest of the tactile input device 100. The tactile input device 100 may also be coupled to a trigger (not shown) to add functionality.

In one embodiment, the tactile input device 100 is a touchpad with tactile features described above. In another embodiment, the input device 100 is a plurality of keys or buttons with the same pattern and tactile features described above. For example, central portion 104, petals 102 and circumferential portion, or ring, 108 might each be separate keys. In another embodiment, the input device 100 might be a button mounted on a post surrounded by a ring key 108. The button would contain portions 102, 104 and borders 112, 114 with the tactile pattern discussed above. The button/post can be depressed to input information from the central portion 104 and can be tilted to input information from petals 102. Ring key 108 could be tilted or depressed to input information to the computing system. While a number of embodiments have been described for the tactile input device 100, any number of combinations of pads, keys, buttons, and posts might be selected to implement the tactile input device 100.

FIG. 2A illustrates the use of a tactile input device 100 in accordance with an embodiment of the present invention. In FIG. 2A, a conceptual representation of a personal digital assistant ("PDA") 200 controlled by a tactile input device 100 is shown in portrait orientation. The tactile input device 100 is shown as the only input device for the PDA 200. Although the tactile input device 100 is shown physically mounted on the PDA 200, other connections, such as an infrared or radio frequency connection, may be used as connections between the PDA 200 and the tactile input device 100.

FIG. 2B illustrates the PDA 200 of FIG. 2A, however, in a landscape orientation and adapted for left-hand use. FIG. 2C illustrates the PDA 200 of FIG. 2A, however, adapted for right-hand use. In order to switch hand orientation, the output of the display (such as 306 in FIG. 3) should be rotated 180 degrees. In other embodiments, the tactile input device 100 may be used as the primary input device to a cellular telephone (not shown), a wearable computer (not shown), a personal computer (not shown), or any other computing system or device.

Figure 3:
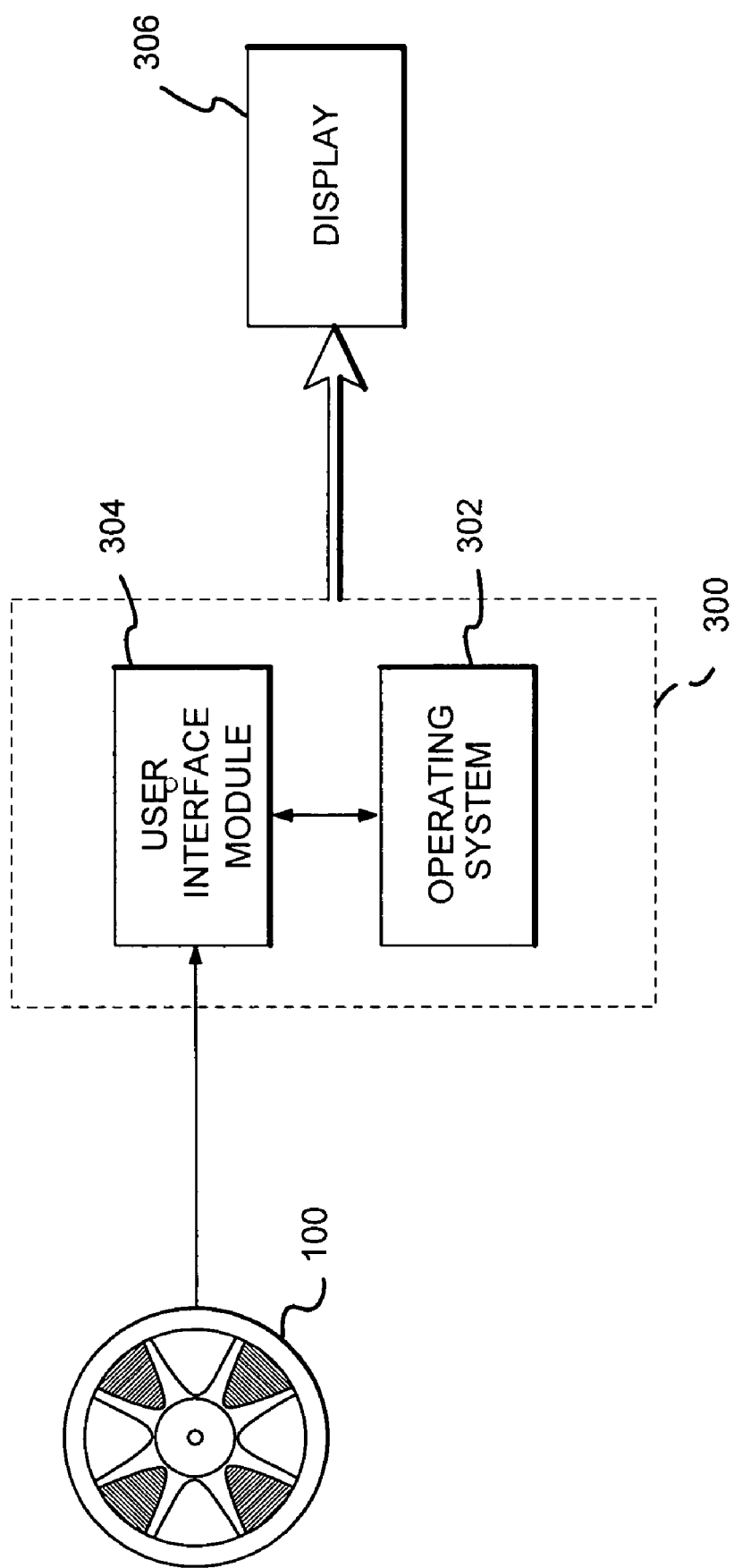
FIG. 3 shows a conceptual illustration depicting interaction between the tactile touchpad and a computing system.

Referring to FIG. 3, a conceptual illustration of the interaction between the tactile input device 100 and a computing system 300 is shown. The computing system 300 includes an operating system 302, a user interface interpretation module 304, and a display 306. In accordance with an embodiment, the user interface interpretation module 304 is a part of the user interface of the computing system 300 that interprets user information transmitted to the interface. The user interface interpretation module 304 may be designed with either software or logic. The user interface interpretation module 304 is a part of the operating system 302, but could be a program installed on the operating system 302. A user interacts with the computing system 300 through the tactile input device 100, which is operably connected to the user interface interpretation module 304. In accordance with an embodiment, the user interface interpretation module 304 contains capabilities of supporting one user input device (such as 100) providing all input sensing devices 120. The tactile input device 100 and the user interface interpretation module 304 are developed in a way so that the computing system 300 is controlled by the tactile input device 100 through the user interface interpretation module 304. The display 306 provides visual feedback to the user of operations performed by the user interface interpretation module 304 pursuant to commands transmitted from the tactile input device 100.

Figure 4:
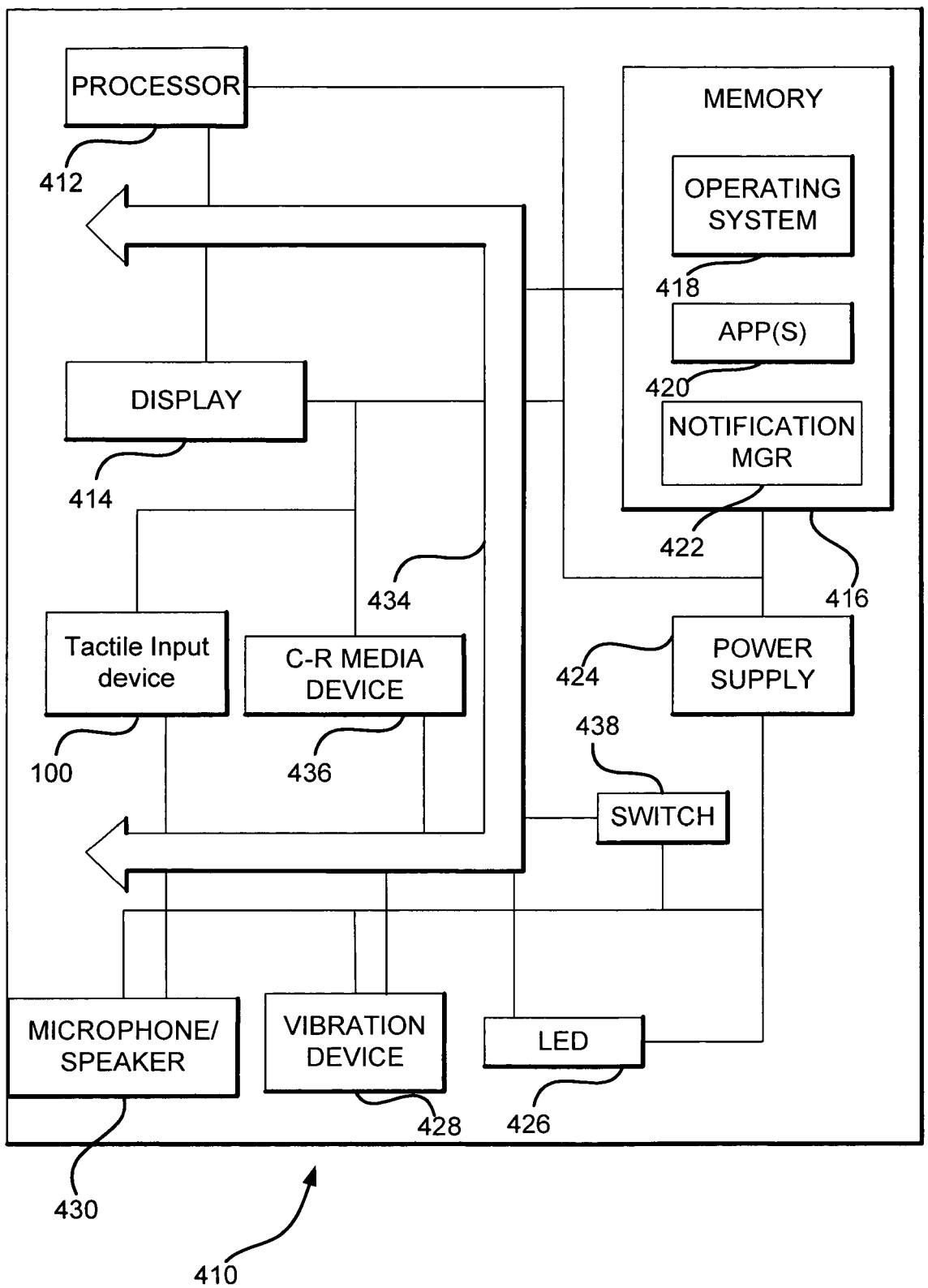
FIG. 4 illustrates an exemplary small computing device for operating in accordance with the various embodiments of the invention.

FIG. 4 illustrates an example of a suitable operating environment 410 in which embodiments of the invention maybe implemented. The operating environment 410 is only one example of a suitable operating environment and is not intended to suggest any limitation as to the scope of use or functionality of the invention. Other well known computing systems (such as 300), environments, and/or configurations that may be suitable for use with the invention include, but are not limited to, personal computers, server computers, handheld (such as 200) or laptop devices, multiprocessor systems, microprocessor-based systems, programmable consumer electronics, network PCs, minicomputers, mainframe computers, distributed computing environments that include any of the above systems or devices and the like.

FIG. 4 shows components of a small computing device 410. Various small computing devices may have all or some of the components illustrated in FIG. 4. The small computing device has a processor 412, a memory 416, and a tactile input device 100.

The memory 416 generally includes both volatile memory (e.g. RAM) and non-volatile memory (e.g. ROM, PCMCIA cards, etc.). An operating system (302 in FIG. 3) is resident in memory 416 and executes on the processor 412. The small computing device 410 includes an operating system 418 (302 in FIG. 3), such as the Windows® CE operating system from Microsoft Corporation or other operating systems including device specific operating systems for the simple computing device.

One or more applications 420 are loaded into memory 416 and run on the operating system 418. Exemplary applications, each of which are hereinafter referred to generally as "application programs," include telephony programs, email programs, scheduling programs, PIM (personal information management) programs, word processing programs, spreadsheet programs, Internet browser programs, etc. The small computing device 410 also has a notification manager 422 loaded in memory 416. The notification manager 422 handles notification requests from the applications 420.

The small computing device 410 has a power supply 424, which is implemented as one or more batteries. The power supply 424 might further include an external power source that overrides or recharges the batteries mounted in the device. The external power source might include an AC adapter or a powered docking cradle.

The small computing device 410 is also shown with two types of external notification plus a microphone/speaker 430. The external notification devices are an LED 426 and a vibration device 428. In addition, the speaker in the microphone/speaker 430 may be used to provide audio notification. These notification devices are directly coupled to the power supply 424 so that when activated, they remain on for a duration dictated by the notification mechanism. Switch 438 is controlled by the processor 432 to shut off power to conserve energy.

The small computing device 410 typically includes at least some form of computer readable media. Computer readable media can be any available media that can be accessed by small computing device 410. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by the small computing device 410. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared and other wireless media. Combinations of any of the above should also be included within the scope of computer readable media.

Figure 11:
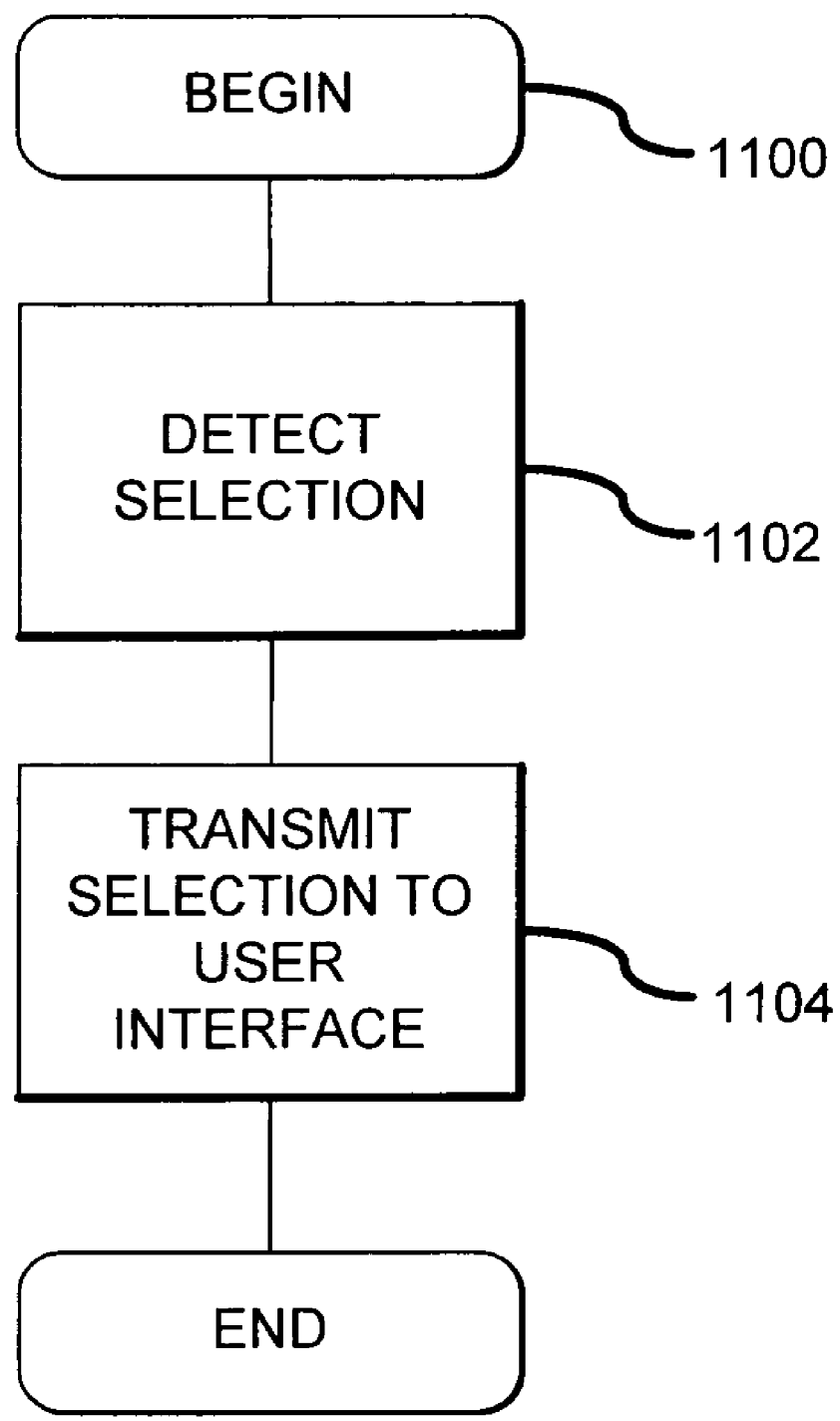
FIG. 11 generally illustrates operations of the tactile input device for providing computer input and control to a computing system in accordance with an embodiment of the present invention.

In one embodiment of the present invention, interaction between the tactile input device 100 and the computing system 300 is administered through a selection signal transmitted from an input sensing device 120 on the tactile touchpad 100. Each input sensing device 120, described below through the operational flow of FIG. 11, is linked to an information, or control, element associated with a task to be performed in the computing system 300. As discussed below, a task is a command to be implemented in the computing system. In accordance with various embodiments, the task might be executed by the operating system, the application program calling the operation, the user interface through which the application is operating, or the navigational interface. In particular, selection of an information element or group of information elements requests performance of a particular task by one of the various embodiments. For instance, an application selection information element is associated with the task of activating an application installed on the computing system, an application operation information element is associated with the task of providing control over an operation of an application, and a text input information element is associated with the task of textual and character input into an application. Additionally and in other embodiments, the information element, which is controlled by a user interface interpretation module 304, might independently provide for the execution of the particular task.

Each input sensing device 120 is linked to an information element associated with a specific task. The information elements define tasks to be administered and are dynamically generated for each input sensing device 120 following the performance of a task in the computing system 300. In accordance with one embodiment, a single information element is the only information element associated with a particular task. In other embodiments, a group of information elements might be associated with one particular task. In this embodiment, selection of all the information elements associated with the task requests performance of the task.

According to one embodiment, the entering and editing of text and operations associated with editing text, might be a task. In other embodiments, activation and operation of an application might be tasks. In accordance with various embodiments, the application might be an application program, an operating system, the user interface operating with the tactile input device 100, a desktop environment defined by a user interface, or any other program operating on the operating system of a computing system 300. Immediately following start-up, or boot, of the computing system 300, the primary active application is a desktop environment prompting a user to select from various applications operating on the desktop environment. A desktop environment is an arrangement defined by the user interface controlling operations of the applications installed on the operating system 302. The desktop environment is a media through which the user may initiate computer control and application activation.

In yet other embodiments, overall computer control might be a task. In this embodiment, control over operations of either the operating system 302, the desktop environment, or the user interface might be administered. Whereas input sensing devices 120 are associated with the tactile input device 100, information elements are dynamically generated by the user interface interpretation module 304 for each instance of the user interface 304. Information elements are dynamically updated in light of the current operation, task, or function to be performed.

Figure 5:
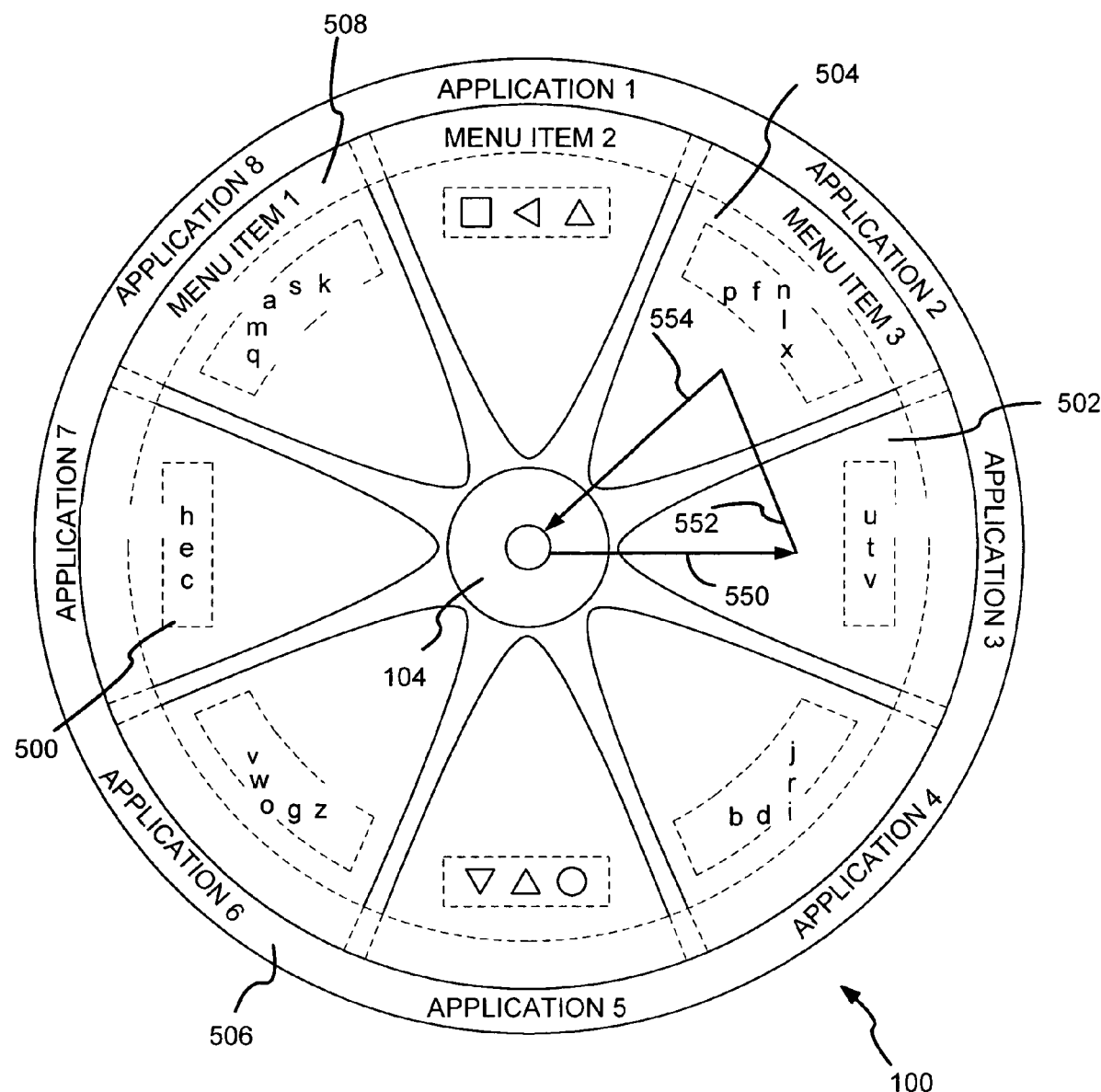
FIG. 5 illustrates an arrangement of information elements provided by the user interface to be used by the tactile touchpad as selection elements in accordance with one embodiment of the present invention.

FIG. 5 illustrates a default arrangement of information elements, such as a character pattern 500 and an application navigation directory ring 506, to be used with one embodiment of the present invention wherein the tactile input device 100 is used to select information elements. The default arrangement also includes application specific menu items 508 for the primary active application of the desktop environment. Information elements may be graphical informational elements such as icons, images, Internet links, file links, tasks, and program operations, etc. or alphabetic, numeric, or symbolic characters. The application navigation directory ring 506 dictates which petal 102 contains an application link for activating specific application programs. As will be illustrated in FIGS. 7A and 7B, applications are selected by a single touch and lift on a petal 102 corresponding to the desired application, as referenced by the application navigation directory ring 506. If the application selected is already open, then selection of the application from the application navigation ring 506 activates the selected application on the desktop environment.

In one embodiment of the present invention, text is selected in accordance with the Qwickwriting® technique taught by Kenneth Perlin in U.S. Pat. Nos. 5,764,794 and 6,031,525. Characters are entered/edited using the Qwickwriting® technique based upon selection of petals 102. The input strokes defining characters begin and end in the central portion 104. A particular character is entered based upon the range of patterns detected by the tactile input device 100 between the beginning and end of the input stroke. An input stroke is accomplished by a user initiating contact with a first position on the surface of the tactile input device 100 and then either a) continuing the stroke to another position on the surface prior to terminating contact, or b) immediately terminating the stroke contact prior to continuing to another position. In accordance with one embodiment, a user strokes over a touchpad surface of the tactile input device 100 with a finger, and more preferably, with a thumb. In this embodiment, contact initiation is administered by touching the touchpad surface with a finger and contact termination is administered by lifting the finger. If the user selects a petal 102 using a touch and immediate lift, or press stroke, then, in accordance with one embodiment, the user has activated an application program assigned to the particular petal 102 selected.

In accordance with an embodiment, input strokes are terminated each time the user selects the central portion 104 and each time the user terminates, or lifts, the input stroke from the tactile input device 100. An input stroke may begin at any position of the tactile input device 100. As an example, FIG. 5 illustrates selection of the character "u" on the tactile input device 100. Stroke 550 begins in the central portion 104 and continues on to an origination petal 502 representing the letters "u," "t," and "v." The character "u" is selected by a stroke 552 continuing to one selection petal 504 counterclockwise from the origination petal 502. The character is inputted by a stroke 554 from the selection petal 504 to the central portion 104. Strokes 550–554 define an input stroke as the continuous movement wherein the user's finger is not lifted until the conclusion of the stroke 554 in the central portion 104. FIGS. 6–9 further illustrate operations performed when committing to the tactile input device 100.

Figure 10:
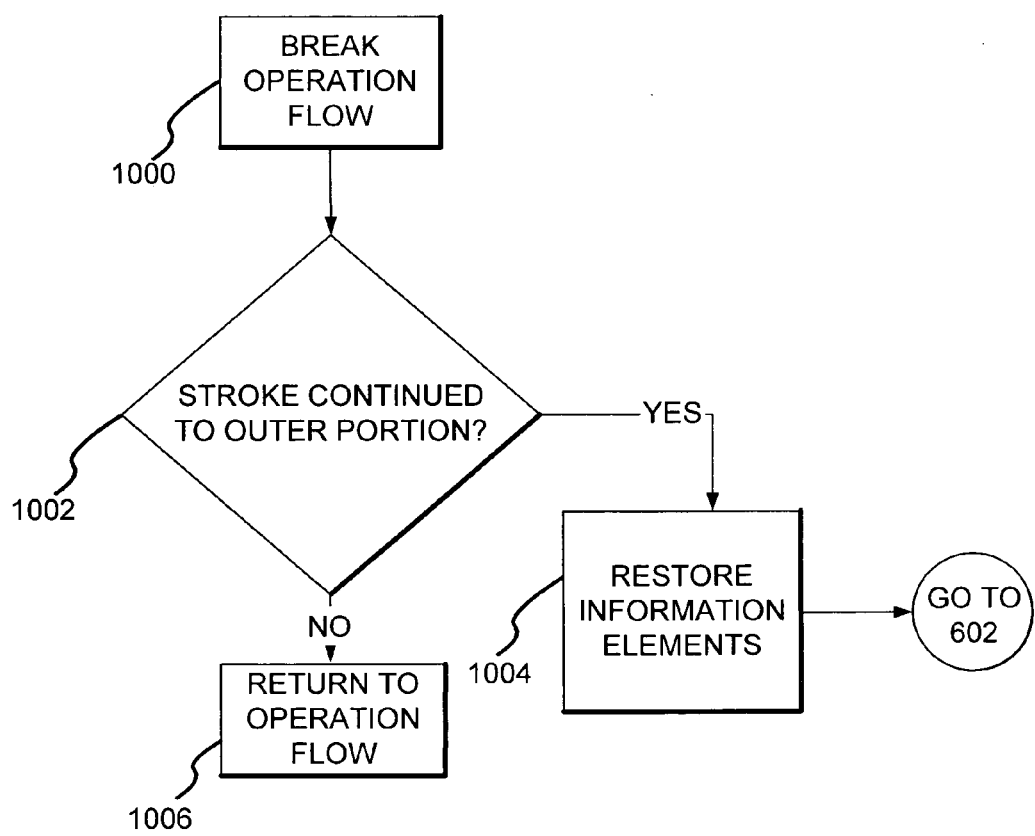
FIG. 10 illustrates operations associated with a cancel lip used to abort an input command in the middle of an input stroke in accordance with one embodiment of the present invention.

Referring back to FIG. 1, in one embodiment of the present invention, the outer circumferential portion 108 is a cancel lip for a user to abort the operation after touching a petal 102. Otherwise, once a user has touched a petal 102, the user must commit to the operation. FIG. 10 further illustrates operation of the cancel lip.

The logical operations of the various embodiments of the present invention in FIGS. 6, 7, 8, 10, and 11 are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof, without deviating from the spirit and scope of the present invention as recited within the claims attached hereto.

FIG. 11 generally illustrates operations of the tactile input device 100 for providing computer input and control to a computing system 300 in accordance with an embodiment of the present invention. The operation for providing computer input and control begins with start operation 1100 once the user initiates contact with the tactile input device 100. In one embodiment, the tactile input device 100 is a touchpad having sensors for detecting touch by the user. The sensors are input sensing devices 120 that transmit selection signals indicative of a user request to the user interface interpretation module 304. While a sensory touchpad is generally described in the operation flow of FIG. 11 and more particularly described in FIGS. 6 through 10, any number of combinations of pads, keys, buttons, and posts might be selected as an input sensing device 120 to the user interface interpretation module 304.

Start operation 1100 initiates the operation flow for providing a request associated with computer input and control to a user interface interpretation module 304 through the tactile input device 100. Detect operation 1102 detects selection of an input sensing device 120. Each input sensing device 120 is linked to an information element representing a task to be performed in the computing system 300.

According to various embodiments, the entering and editing of text, and operations associated with editing text, activation of an application, operation of an application, and overall computer control might all be tasks to be administered in the computing system 300. As described in FIGS. 7 and 8, the information elements associated with each input sensing device 120 are dynamically updated in light of the current task to be performed. Once selection of an input sensing device 120 is realized, transmission operation 1104 transmits a selection signal from the tactile input device 100 to the user interface interpretation module 304. A selection signal is a signal from an input device (such as 100) that is recognizable by the user interface interpretation module 304 as a task to be performed in the computing system 300. Following transmission operation 1104, termination operation 1106 terminates the operation flow.

In one embodiment, a particular task associated with an input sensing device 120 might be the entering of a character into an application. In another embodiment, a particular task might be the activation of an application on the display. In yet another embodiment, a particular task might be the generation of updated information elements for an application operating through the user interface 100. For example, the particular task might be the opening of the menu items 508 of the file menu of an application.

Figure 6:
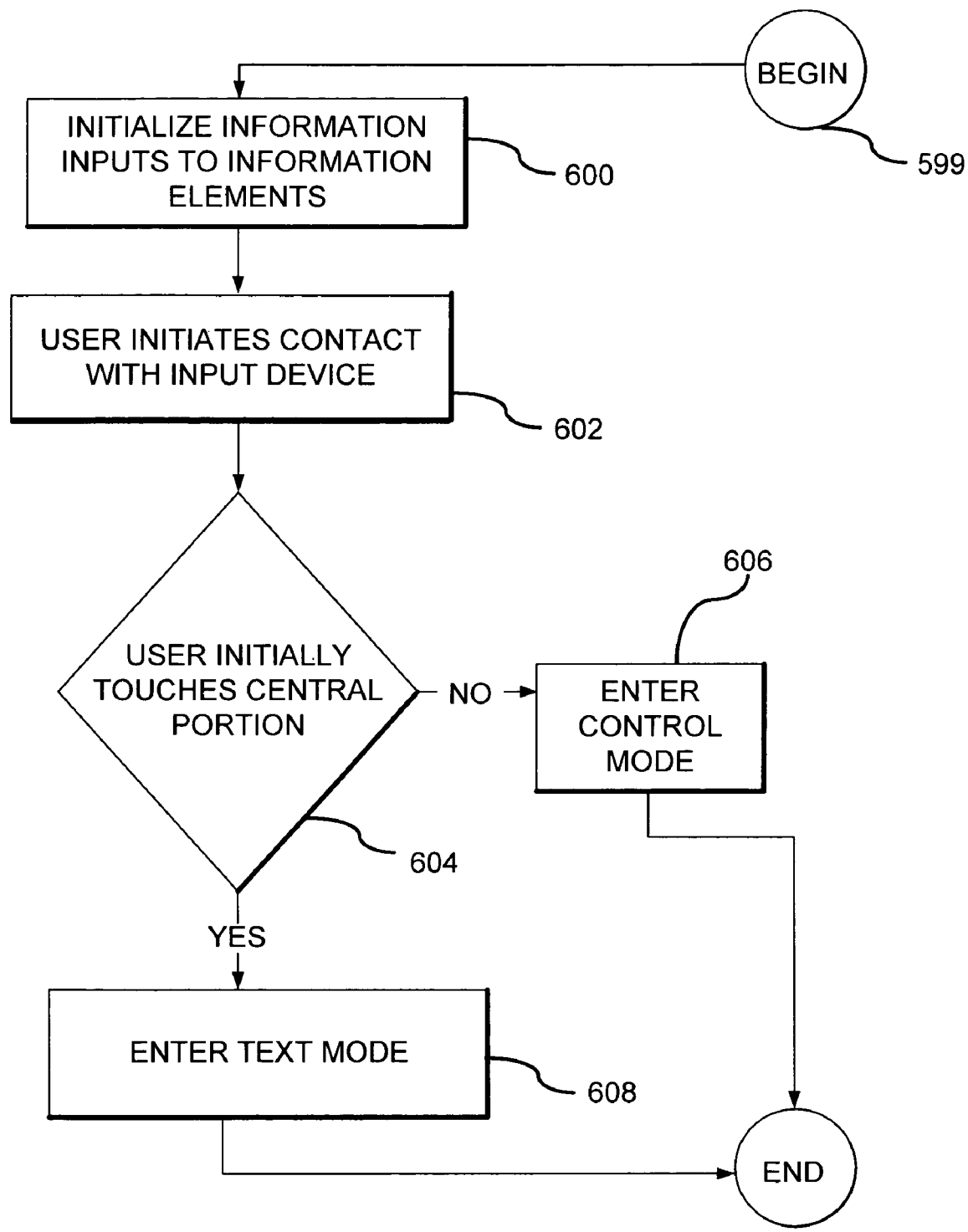
FIG. 6 illustrates general operations of a user interface as it interacts with a tactile touchpad to control a computing device in accordance with one embodiment of the present invention.

FIG. 6 further illustrates the operations performed by the tactile input device 100 in detecting selection of an input sensing device 120 and transmitting the selection signal associated with the selection to the user interface interpretation module 304. In particular, FIG. 6 further describes the operations of detect operation 1102 and transmission operation 1104. The operational flow of FIG. 6 illustrates user selection of one of two operating modes of user interface interpretation module operation based upon the location of the user's initial selection on the tactile input device 100. The two rendering modes of user interface interpretation module operation are a text-operating mode and a control-operating mode. FIGS. 7 through 10 elaborate on FIG. 6, thus providing further detail of the operations triggered through a user interface interpretation module 304 controlled by the tactile input device 100. In an embodiment, interface default operation 600, provided by the user interface interpretation module 304, initializes the information elements associated with the input sensing devices 120 of the tactile input device 100 to an application arrangement incorporating the character pattern of FIG. 5. The application arrangement contains information elements representing tasks associated with operating the active application running through the user interface. In accordance with various embodiments, the application might be an application program, an operating system, a desktop environment defined by a user interface, or any other program operating on the operating system of a computing system 300. In one embodiment the application arrangement might be defined as an initial/default arrangement specified by the active application. In another embodiment, the arrangement might be an instance defined by performance of an immediately previous task.

Figure 7A:
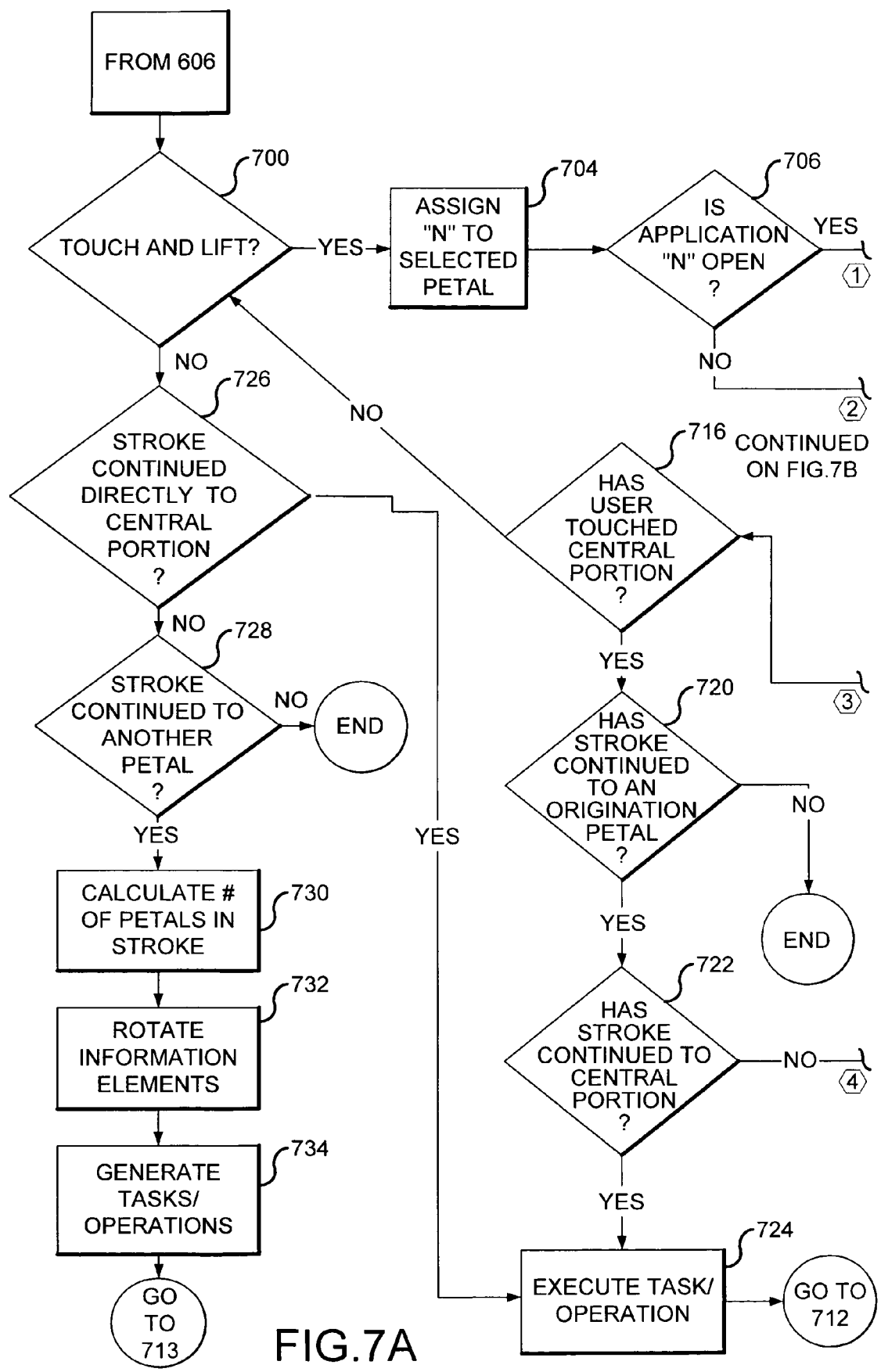
FIGS. 7A and 7B illustrate operations of a user interface in the control-operating mode as it interacts with a tactile touchpad to control operations of applications installed on a computing system.
Figure 7B:
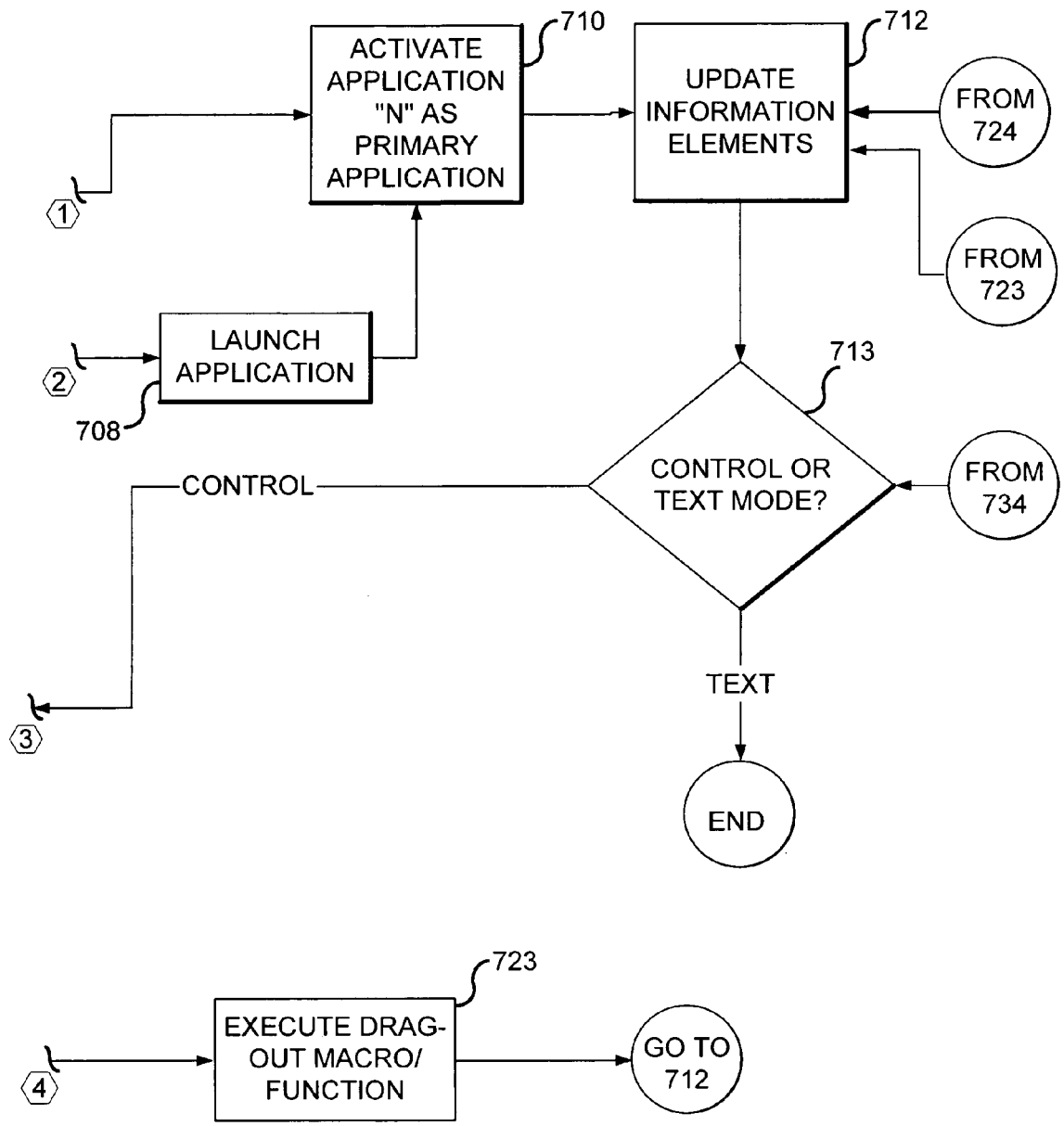
Figure 8:
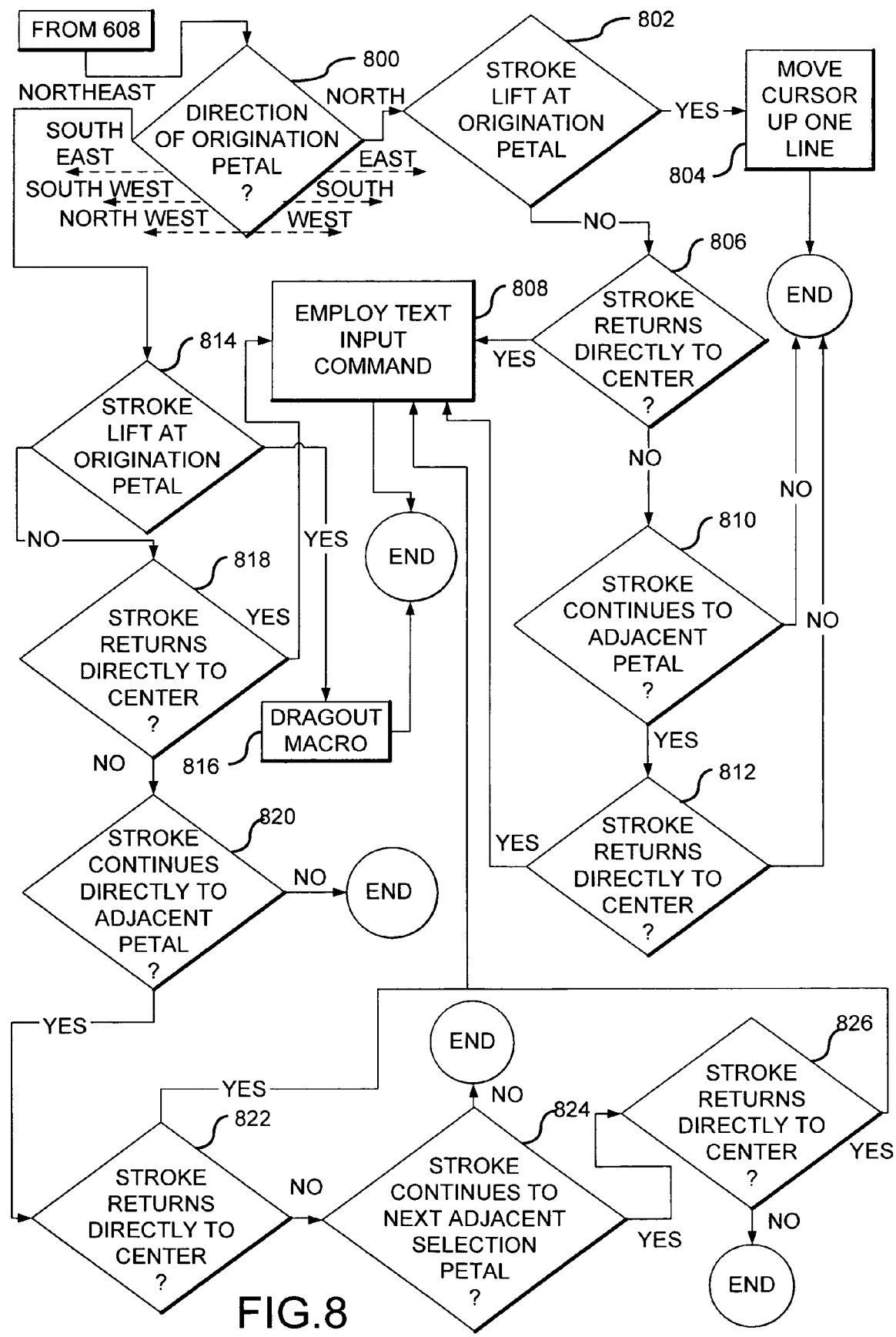
FIG. 8 illustrates operations of a user interface in text-operating mode as it interacts with a tactile touchpad to input and edit text into various applications.

Sensory operation 602 detects when a user initiates contact with the surface of the tactile input device 100. Once a user touches the tactile input device 100, sensory operation 602 enables request operation 604. Request operation 604 detects whether the user's input stroke begins on the central portion 104 of the tactile input device 100. If the input stroke begins on the central portion 104, then text operation 608 transmits a text selection signal to the user interface interpretation module 304 activating the text-operating mode for text inputting and editing. FIG. 8 shows an embodiment of the operational flow of the text-operating mode of the user interface interpretation module 304 wherein the input sensing devices 120 of the tactile input device 100 are used to select information elements related to text input and editing. Once text-operating mode is complete, as described below in FIG. 8, operation flow is terminated and initialized to beginning 599. If request operation 604 detects that the user has not selected the central portion 104, then navigation operation 606 transmits a control selection signal to the user interface interpretation module 304 activating the control-operating mode for computer control and navigation. FIGS. 7A and 7B show an embodiment of the operational flow of the control-operating mode of the user interface interpretation module 304 wherein input sensing devices 120 of the tactile input device 100 are used to select information elements related to computer control and application navigation. After the control-operating mode is complete, as described below in FIGS. 7A and 7B, operation flow is terminated and initialized to beginning 599.

Figure 9:
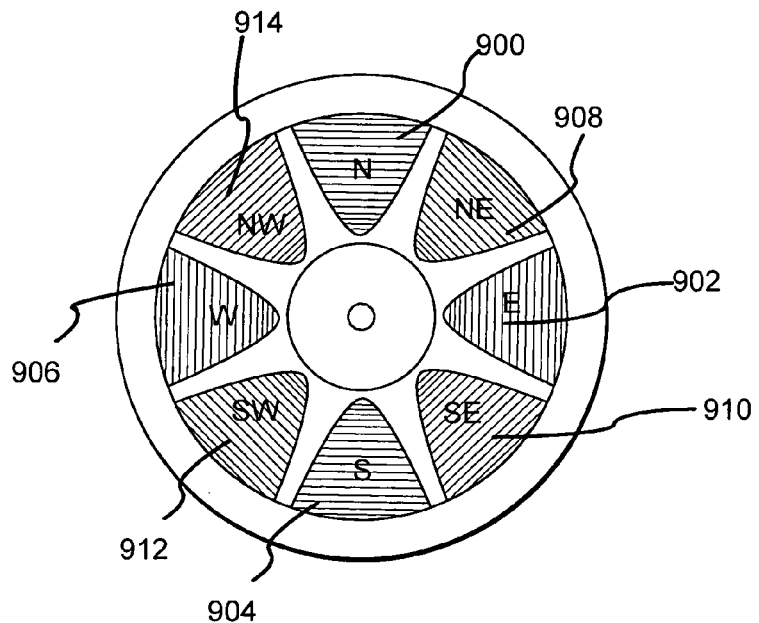
FIG. 9 illustrates a directional orientation of the tactile input device as interpreted by a user interface in the operational flow of FIG. 8.

In the text-operating mode, the tactile touchpad is used to input text commands. Accordingly, the primary task to administer is the entering of text and character inputs through a text stroke. FIG. 8 illustrates various text strokes administering this task in accordance with one embodiment of the present invention. Direction operation 800 in FIG. 8 detects which direction the user's input stroke continues from the central portion 104. Upon detection by direction operation 800, a selection signal indicative of the direction is sent to the user interface interpretation module 304 as described in FIG. 11. In referencing the direction, the top petal 102 of the tactile input device 100 is due north. FIG. 9 is an illustration of one embodiment of the invention showing a directional orientation of the tactile input device 100 as interpreted by the user interface interpretation module 304 in the operation flow of FIG. 8. If the origination petal 502 (the first petal selected in the input stroke) is the north petal 900 (FIG. 9), as detected by direction operation 800, then operation flow passes to lift operation 802. Lift operation 802 detects whether the user completed the input stroke at the origination petal 900. In an embodiment, the input stroke is completed if the user lifts his finger from the tactile input device 102. If the input stroke is completed, a selection signal indicative of the detection is sent to the user interface interpretation module 304 as described in FIG. 11 and operation flow passes to cursor operation 804. Cursor operation 804 moves the cursor in the text editor up one line. Once the cursor is moved up one line, operation flow is terminated. If the input stroke is not completed, as detected by lift operation 802, a selection signal indicative of this detection is sent to the user interface interpretation module 304 as described in FIG. 11 and operation flow passes to return operation 806. Return operation 806 detects whether the user's input stroke continues from the origination petal 502 directly to the central portion 104. If the input stroke returns directly to the central portion 104, a selection signal indicative of this detection is sent to the user interface interpretation module 304 as described in FIG. 11 and operation flow passed to the text input operation 808. Text input operation 808 employs the specific Qwickwriting® command or character in accordance with the Qwickwriting® technique (referenced above). Once the text is entered, operation flow is terminated.

If the input stroke does not return directly to the central portion 104 but instead continues to an adjacent selection petal (a petal adjacent the origination petal), as detected by rotation operation 810, then a selection signal indicative of this detection is sent to the user interface interpretation module 304 as described in FIG. 11 and operation flow passes to a second return operation 812. The second return operation 812 detects whether the input stroke has continued from the adjacent selection petal directly to the central portion 104. If the input stroke returns directly to the central portion 104, then a selection signal indicative of this detection is sent to the user interface interpretation module 304 as described in FIG. 11 and operation flow passes to the text input operation 808. If the input stroke does not immediately return to the central portion 104 or if rotation operation 810 detects that the input stroke did not continue to an adjacent petal, then a selection signal indicative of this detection is sent to the user interface interpretation module 304 as described in FIG. 11 and operation flow is terminated without successfully completing an input operation.

If directional operation 800 detects that the origination petal 502 is either the east 902 (FIG. 9), south 904 (FIG. 9), or west 906 (FIG. 9) petal, then the text-operating mode operates in exactly the same operational flow, however, if the user lifts at the origination petal 502, then cursor operation 804 will move the cursor that direction. For example, if the origination petal 502 is the east petal 902, then cursor operation 804 (if enabled) moves the cursor one character space to the right. Likewise, if the origination petal 502 is the south petal 904, then cursor operation 804 (if enabled) moves the cursor one line down. Finally, if the origination petal 502 is the west petal 906, then cursor operation 804 (if enabled) moves the cursor one character to the left.

If the origination petal 502 is the northeast petal 908, as detected by direction operation 800, then a selection signal indicative of this detection is sent to the user interface interpretation module 304 as described in FIG. 11 and operation flow passes to lift operation 814. Lift operation 814 detects whether the user completed the input stroke at the origination petal 502. In an embodiment, the input stroke is completed if the user lifts his finger from the tactile input device 102. If the input stroke is completed, then a selection signal indicative of this detection is sent to the user interface interpretation module 304 as described in FIG. 11 and operation flow passes to drag-out operation 816. Drag-out operation 816 invokes the drag-out functions of the textual input technique for the specific macro or function represented by the information element in the northeast petal 908. Once execution of the macro or function is complete, operation flow is terminated. If the input stroke is not completed, as detected by lift operation 814, then a selection signal indicative of this detection is sent to the user interface interpretation module 304 as described in FIG. 11 and operation flow passes to return operation 818. Return operation 818 detects whether the user's input stroke continues from the origination petal 502 directly to the central portion 104. If the input stroke returns directly to the central portion 104, then a selection signal indicative of this detection is sent to the user interface interpretation module 304 as described in FIG. 11 and operation flow passes to text input operation 808. Text input operation 808 employs the specific Qwickwriting® command or character in accordance with the Qwickwriting® technique (referenced above). Once the text is entered, operation flow is terminated.

If the input stroke does not return directly to the central portion 104 but instead continues to an adjacent selection petal, as detected by rotation operation 820, then a selection signal indicative of this detection is sent to the user interface interpretation module 304 as described in FIG. 11 and operation flow passes to a second return operation 822. The second return operation 822 detects whether the input stroke has continued from the adjacent selection petal directly to the central portion 104. If the input stroke returns directly to the central portion 104, then a selection signal indicative of this detection is sent to the user interface interpretation module 304 as described in FIG. 11 and operation flow passes to text input operation 808. If rotation operation 820 detects that the input stroke did not continue to an adjacent petal, then a selection signal indicative of this detection is sent to the user interface interpretation module 304 as described in FIG. 11 and operation flow is terminated without successfully completing an input operation.

If the second return operation 822 detects that the input stroke did not continue directly to the central portion 104, then a selection signal indicative of this detection is sent to the user interface interpretation module 304 as described in FIG. 11 and operation flow passes to a second rotation operation 824. Second rotation operation 824 detects whether the input stroke continued from the adjacent selection petal 504 to a next adjacent selection petal (a petal adjacent the adjacent selection petal). If the input stroke did not continue to the next adjacent selection petal, then a selection signal indicative of this detection is sent to the user interface interpretation module 304 as described in FIG. 11 and operation flow is terminated without successfully completing an input operation.

If the second rotation operation 824 detects that the input stroke continues directly to the next adjacent selection petal, then a selection signal indicative of this detection is sent to the user interface interpretation module 304 as described in FIG. 11 and operation flow passes to a third return operation 826. The third return operation 826 detects whether the input stroke has continued from the next adjacent selection petal directly to the central portion 104. If the input stroke returns directly to the central portion 104, then a selection signal indicative of this detection is sent to the user interface interpretation module 304 as described in FIG. 11 and operation flow passes to text input operation 808. If the input stroke does not return directly to the central portion 104, then a selection signal indicative of this detection is sent to the user interface interpretation module 304 as described in FIG. 11 and operation flow is terminated without successfully completing an input operation.

If directional operation 800 detects that the origination petal 502 is either the southeast 910 (FIG. 9), southwest 912 (FIG. 9), or northwest 914 (FIG. 9) petal, then the text-operating mode operates in exactly the same operational flow as for the northeast petal 908 (FIG. 9).

Referring back to FIG. 6, if request operation 604 detects that the user has not selected the central portion 104, then navigation operation 606 transmits a selection signal to the user interface interpretation module 304 activating the control-operating mode for computer control and navigation. FIGS. 7A and 7B show an embodiment of the operational flow of the control-operating mode of the user interface interpretation module 304 wherein input sensing devices 120 of the tactile input device 100 are used to select information elements related to computer control and application navigation. Once control-operating mode is complete, operation flow is terminated and initialized to beginning 599.

In the control-operating mode, the tactile touchpad is used to input control commands. Accordingly, the primary task to administer is selection of a control operation of an application through a control stroke. In accordance with an embodiment, a control operation might be the activation of an application or the implementation of an operation of the application. FIGS. 7A and 7B illustrate various control strokes selecting a control operation task in accordance with one embodiment of the present invention. Referring to FIGS. 7A and 7B, the control-operating mode of the user interface interpretation module 304 is entered through the operation flow of FIG. 6. Lift operation 700 detects whether the user performed a touch and lift on a petal 102 of the tactile input device. If the user performed a touch and lift, then a selection signal indicative of this detection is sent to the user interface interpretation module 304 as described in FIG. 11 and interface selection operation 704 is activated by the user interface interpretation module 304. Selection operation 704, inherent in the user interface interpretation module 304, assigns a variable, n, to the number of the petal 102 selected. Interface status operation 706, inherent in the user interface interpretation module 304, determines whether the application program referenced by petal n is an application already activated on the desktop environment. If interface status operation 706 concludes that the application program is not opened, then interface launch operation 708, an operation performed by the user interface interpretation module 304, calls the execution program of the application in order to launch the application on the desktop. If the program is activated, as determined by interface status operation 706, or once the program is launched by interface launch operation 708, interface activation operation 710, an operation performed by the user interface interpretation module 304, activates the application to be the primary application on the display 306. Interface information operation 712, an operation performed by the user interface interpretation module 304, updates the information elements of the input sensing devices 120 of the tactile input device 100 to represent tasks specific to the activated application. Interface control operation 713, an operation performed by the user interface interpretation module 304, determines whether the tasks and operations represented by the information elements are associated with either the control-operating mode or the text-operating mode of the user interface interpretation module 304. If the information elements are associated with the control-operating mode, then operation flow passes to touch operation 716. If the information elements are associated with the text-operating mode, then operation flow is terminated and may be re-initiated at beginning 599.

Touch operation 716 detects whether the user has touched the central portion 104 of the tactile input device 100. If the user has not selected the central portion 104, then a selection signal indicative of this detection is sent to the user interface interpretation module 304 as described in FIG. 11 and operation flow passes to lift operation 700. From lift operation 700, operation flow in the control-operating mode is continued as described earlier and below. If the user has initiated contact with the central portion 104, then a selection signal indicative of this detection is sent to the user interface interpretation module 304 as described in FIG. 11 and operation flow passes to stroke operation 720.

Stroke operation 720 detects whether the user has continued the input stroke from the central portion 104 to an origination petal 502. If the user has not continued directly to an origination petal 502, then a selection signal indicative of this detection is sent to the user interface interpretation module 304 as described in FIG. 11 and operation flow is terminated without completion of any input commands. In an alternative embodiment, if the user has not continued to an origination petal 502, then a selection signal of this detection is interpreted by the interface interpretation module 304 as a request to perform a particular task associated with the information element referenced by the central portion 104. If the user has continued directly to an origination petal 502, then a selection signal indicative of this detection is sent to the user interface interpretation module 304 as described in FIG. 11 and operation flow passes to return operation 722. Return operation detects whether the user's input stroke continued directly from the origination petal 502 to the central portion 104. If the input stroke has not continued directly to the central portion 104, then a selection signal indicative of this detection is sent to the user interface interpretation module 304 as described in FIG. 11 and operation flow passes to control drag-out operation 723. Control drag-out operation 723, an operation performed by the user interface interpretation module 304, invokes the drag-out functions of the textual input technique for the specific macro or function represented by the information element associated with the origination petal 502. Once execution of the macro or function is complete, operation flow passes to information operation 712 and operation flow continues as earlier discussed.

If the user continues to the central portion 104, as detected by return operation 722, then a selection signal indicative of this detection is sent to the user interface interpretation module 304 as described in FIG. 11 and operation flow passes to interface execution operation 724. Interface execution operation 724, an operation performed by the user interface interpretation module 304, directs the user interface interpretation module 304 to perform the task represented by the information element of the origination petal 502. After the task or operation is executed, operation flow passes to information operation 712 and operation flow continues as earlier discussed.

If it is detected in lift operation 700 that the user did not perform a touch and lift, then a selection signal indicative of this detection is sent to the user interface interpretation module 304 as described in FIG. 11 and operation flow passes to drag operation 726. Drag operation 726 detects whether the user has continued the input stroke directly to the central portion 104. If the user has continued the input stroke directly to the central portion 104, then a selection signal indicative of this detection is sent to the user interface interpretation module 304 as described in FIG. 11 and operation flow passes to interface execution operation 724. Interface execution operation 724 directs the user interface interpretation module 304 to perform the task represented by the information element of the origination petal 502 subject to the drag-in detected by drag operation 726. After the task is performed, operation flow passes to information operation 712 and operation flow continues as earlier discussed.

If it is detected in drag operation 726 that the user has not continued the input stroke directly to the central portion 104, then a selection signal indicative of this detection is sent to the user interface interpretation module 304 as described in FIG. 11 and operation flow passes to petal operation 728. Petal operation 728 detects whether the user's input stroke has continued to another petal 102. If the user has continued the input stroke to another petal 102, then a selection signal indicative of this detection is sent to the user interface interpretation module 304 as described in FIG. 11 and operation flow passes to interface calculation operation 730. If the input stroke has not continued to another petal 102, then a selection signal indicative of this detection is sent to the user interface interpretation module 304 as described in FIG. 11 and operation flow is terminated.

Interface calculation operation 730, an operation performed by the user interface interpretation module 304, calculates the number of petals 102 touched following initial contact on the tactile input device 100. Once interface calculation operation 730 terminates, interface rotation operation 732, an operation performed by the user interface interpretation module 304, rotates the information elements associated with the input sensing devices 120 of the petals 102 of the tactile input device 100 in the direction (clockwise or counterclockwise) and number of petals 102 as calculated by the interface calculation operation 730. By rotating the information elements, users can dictate which task is represented as the north petal 900 and primary menu item 508 of the tactile input device 100. Accordingly, interface update operation 734, an operation performed by the user interface interpretation module 304, generates information elements material to the task that is currently referenced by the north petal 900 of the tactile input device 100. Following interface update operation 734, operation flow passes to control operation 713 and operation flow continues as earlier discussed.

In one embodiment of the present invention, the outer circumferential portion 108 is used as a cancel lip to abort a command in the middle of an input stroke. FIG. 10 is an illustration of a stroke cancel operation in accordance with one embodiment of the invention. The operational flow of FIG. 10 may be used in all operations of FIGS. 7 and 8 wherein the user is currently performing an input stroke. In essence, the operational flow of FIG. 10 resets the information elements associated with the input sensing devices 120 of the tactile input device 100 to the immediate previous instance of the user interface. An instance is a momentary portrayal of the information elements of the user interface immediately prior to the performance of a task.

Receive operation 1000 breaks operation flow and passes operation flow to abort operation 1002. Abort operation 1002 detects whether the input stroke has continued from any position on the input device to the outer circumferential portion 108. If the input stroke has been extended to the outer circumferential portion 108, then a cancel selection signal indicative of this detection is sent to the user interface interpretation module 304 as described in FIG. 11 and operation flow passes to interface reset operation 1004. Interface reset operation 1004, an operation performed by the user interface interpretation module 304, restores the information elements of the immediate previous instance and operation flow passes to sensory operation 602. If the input stroke has not been extended to the outer circumferential portion 108, then transmit operation 1006 returns operation flow to the point where it was interrupted by receive operation 1000.

Although the invention has been described in language specific to computer structural features, methodological acts and by computer readable media, it is to be understood that the invention defined in the appended claims is not necessarily limited to the specific structures, acts or media described. As an example, other textual input methods may be included in the user interface in combination with the tactile input device. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. In a computing system having a user interface, a user input device for inputting information into a computing system, the user input device comprising:
   a tactile surface divided by a plurality of sections, each section being tactilely distinguished from an adjacent section; and
   a plurality of input sensing devices initialized such that each input sensing device is associated with a section and one of a plurality of information elements, wherein each information element is associated with a task to be performed by the computing system, each input sensing device for detecting an input stroke contacting the associated section and transmitting a selection signal indicative of the contacted section to the computing system.

2. The user input device according to claim 1, wherein the task to be performed is text input into an application installed on the computing system.

3. The user input device according to claim 1, wherein the task to be performed activates an application installed on the computing system.

4. The user input device according to claim 3, wherein the application activated is selected from a group consisting of a desktop environment, an operating system, and an application program.

5. The user input device according to claim 1, wherein the task to be performed is a control operation in an application.

6. The user input device according to claim 5, wherein the application is from a group consisting of a desktop environment, an operating system, and an application program.

7. The user input device according to claim 1, wherein:
   at least one input sensing device is associated with an application selection information element displayed on the user interface and associated with the task of activating an application installed on the computing system;
   at least one input sensing device is associated with an application operation information element displayed on the user interface and associated with the task of providing control over operation of an application installed on the computing system; and
   at least one input sensing device is associated with a text input information element displayed on the user interface and associated with the task of textual and character input into an application installed on the computing system.

8. The user input device according to claim 1, wherein the plurality of sections comprises:
   a central portion forming a single section; and
   a petals portion having a plurality of petals angularly dividing the tactile surface between the central portion to an outer circumferential portion of the tactile surface, each petal forming a single section; and
   the outer circumferential portion forming a single section whereby the input stroke contacts at least one section to request performance of a particular task.

9. The user input device according to claim 8, wherein central portion further comprises:
   a raised reference point tactilely identifying the central portion.

10. The input device according to claim 1, wherein the tactile surface is a touchpad having a tactile pattern providing orientation feedback to the user inputting the user request.

11. The input device according to claim 10, wherein each input sensing device is a button detecting the input stroke.

12. In a computing system having a user interface, the user interface having a user interface selection device for inputting control and text commands into the computing system, the user interface selection device comprising:
   a tactile touchpad having a tactile pattern providing orientation feedback to a user inputting a specific user request, the touchpad angularly divided by a plurality of petals, each petal being tactilely distinguished from an adjacent petal and forming a single section;
   a central portion separating the center of the tactile touchpad from the plurality of petals, the central portion being tactilely distinguished from the plurality of petals and forming a single section;
   an outer portion separating an outer boundary of the tactile touchpad from the plurality of petals, the outer portion being tactilely distinguished from the plurality of petals and forming a single section; and
   a plurality of input sensing devices initialized such that each input sensing device is associated with a section and one of a plurality of information elements wherein each information element is associated with a task to be performed by the computing system, each section having at least one input sensing device operable to detect an input stroke contacting the associated section and transmitting a selection signal indicative of the contacted section to the computing system.

13. The user interface selection device according to claim 12, wherein the specific user request comprises a text command requested with an out-return stroke beginning on the central portion, continuing to at least one petal, and terminating in the central portion, the out-return stroke requesting textual input to the computing system.

14. The user interface selection device according to claim 12, wherein the specific user request comprises a control command selected with a drag-out stroke beginning on the central portion, continuing to a petal, and terminating on the petal, the drag-out stroke requesting selection of a control operation on the computing system.

15. In a computing system having a user interface, the user interface having a user interface selection device for inputting control and text commands into the computing system, the user interface selection device comprising:
   a tactile touchpad having a tactile pattern providing orientation feedback to a user inputting a specific user request, the touchpad angularly divided by a plurality of petals, each Petal being tactilely distinguished from an adjacent petal and forming a single section;
   a central portion separating the center of the tactile touchpad from the plurality of petals, the central portion being tactilely distinguished from the plurality of petals and forming a single section;
   an outer portion separating an outer boundary of the tactile touchpad from the plurality of petals, the outer portion being tactilely distinguished from the plurality of petals and forming a single section; and
   a plurality of input sensing devices, each section having at least one input sensing device operable to detect an input stroke defining the specific user request and transmitting a selection signal indicative of the specific user request to the computing system
wherein the specific user request comprises a control command selected with a drag-in stroke beginning on a petal, continuing to the central portion, and terminating on the central portion, the drag-in stroke requesting selection of a control operation on the computing system.

* * * * *